United States Patent
Tauk et al.

(10) Patent No.: US 9,500,852 B1
(45) Date of Patent: Nov. 22, 2016

(54) ELECTROWETTING DEVICE WITH A DIELECTRIC LAYER

(71) Applicant: Amazon Technologies, Inc., Seattle, WA (US)

(72) Inventors: Lara Tauk, Eindhoven (NL); Pavel Novoselov, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 14/501,805

(22) Filed: Sep. 30, 2014

(51) Int. Cl.
G02B 21/06 (2006.01)
G02B 26/00 (2006.01)

(52) U.S. Cl.
CPC .................................. G02B 26/005 (2013.01)

(58) Field of Classification Search
CPC .. G02B 26/00; G02B 26/004; G02B 26/005; G02B 26/007–26/008; G02F 1/29; G02F 1/31
USPC ................ 359/227, 237, 290–297, 315–320, 359/665–667
See application file for complete search history.

(56) References Cited

U.S. PATENT DOCUMENTS

| 7,579,271 | B2 | 8/2009 | Ang |
| 7,956,947 | B2 | 6/2011 | Lee et al. |
| 2009/0079689 | A1* | 3/2009 | Miyata ................. G02B 26/004 345/107 |
| 2013/0329274 | A1* | 12/2013 | Yang .................... G02B 26/005 359/290 |

OTHER PUBLICATIONS

S.G. Yoon, et al., "Characterization of Low Refractive Index SiOCF:H Films Designed to Enhance the Efficiency of Light Emission", J Electroceram (2006) 16, http://link.springer.com/article/10.1007/s10832-006-9899-8, pp. 469-472.
Shi-Jin Ding, et al., "The Influence of Ar Addition on the Structure of an a-SiOCF Film Prepared by Plasma-Enhanced Chemical Vapour Deposition", J. Phys. D: Appl. Phys. 34 (2001), http://iopscience.iop.org/0022-3727/34/2/302/pdf/d10202.pdf, pp. 155-159.

\* cited by examiner

*Primary Examiner* — Scott J Sugarman
*Assistant Examiner* — Robert E Tallman
(74) *Attorney, Agent, or Firm* — EIP US LLP (57) ABSTRACT

An electrowetting device includes an electrowetting element having a first fluid; a second fluid immiscible with the first fluid, a configuration of the first and second fluids being controllable with an applied voltage; and at least one electrode for providing the applied voltage. The electrowetting device includes a plurality of electrical elements for providing the applied voltage, which include a first electrical element and a second electrical element. A portion of the first electrical element overlaps a portion of the second electrical element. The electrowetting device includes a dielectric layer between the portions of the first and second electrical elements, the dielectric layer formed at least partly of a dielectric material having a dielectric constant less than 3.9.

20 Claims, 6 Drawing Sheets

ELECTROWETTING DEVICE WITH A DIELECTRIC LAYER

BACKGROUND

In known electrowetting devices an array of electrical connectors is used for applying voltages to electrowetting pixels of the device, to control an image being displayed. With ongoing developments to reduce the size of electrowetting devices, electrical connectors in the array may be positioned more closely to other electrical connectors in the array. However, this can increase the occurrence of parasitic capacitance effects in the device, between electrical connectors which are sufficiently close to each other. Such parasitic capacitances are undesirable as power is required to charge up the parasitic capacitor. Thus, for a reduced size device, a power consumption may be increased.

It is desirable to reduce a power consumption of an electrowetting device.

DETAILED DESCRIPTION

Figure 1:
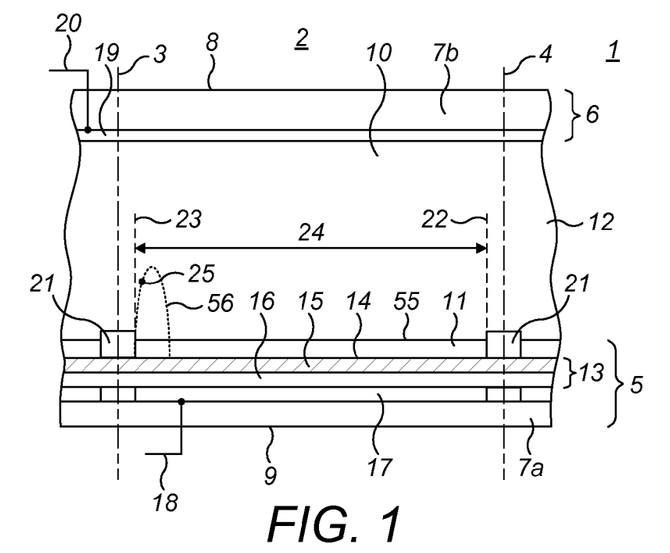
FIG. 1 shows schematically an example electrowetting display element.

FIG. 1 shows a diagrammatic cross-section of part of an example of an electrowetting device, in this example an electrowetting display device 1, including a plurality of picture elements or display elements 2, one of which is shown in the Figure and which may also be referred to as an electrowetting cell or an electrowetting element. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible. An electrowetting device is a device including one or more electrowetting element, such as the display element described herein according to examples. As will be explained later, the electrowetting device may include circuitry, for example a plurality of electrical connectors arranged as a matrix, for use in controlling the at least one electrowetting element.

The display device has a viewing side 8 on which an image or display formed by the display device can be viewed and a rear side 9. In the Figure a surface of the first support plate 5, which surface is in this example a surface of the substrate 7a, defines the rear side 9; a surface of the second support plate 6, which surface is in this example a surface of the substrate 7b, defines the viewing side; alternatively, in other examples, a surface of the first support plate may define the viewing side. The display device may be of the reflective, transmissive or transflective type. The display device may be of a segmented display type in which the image may be built up of segments, each segment including several display elements. The display device may be an active matrix driven display device. The plurality of display elements may be monochrome. For a color display device the display elements may be divided in groups, each group having a different color; alternatively, an individual display element may be able to show different colors.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface which defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

The second fluid is electrically conductive or polar and may be water, or a salt solution such as a solution of potassium chloride in water. The second fluid may be transparent; it may instead be colored, absorbing or reflecting. The first fluid is electrically non-conductive and may for instance be an alkane like hexadecane or may be an oil such as silicone oil.

The first fluid may absorb at least a part of the optical spectrum. The first fluid may be transmissive for a part of the optical spectrum, forming a color filter. For this purpose the first fluid may be colored by addition of pigment particles or a dye. Alternatively, the first fluid may be black, i.e. absorb substantially all parts of the optical spectrum, or reflecting. A reflective first fluid may reflect the entire visible spectrum, making the layer appear white, or part of it, making it have a color.

The support plate 5 includes an insulating layer 13. The insulating layer may be transparent or reflective. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing the space 10 of the display element 2. In this example the surface 14 is hydrophobic. The thickness of the insulating layer may be less than 2 micrometers and may be less than 1 micrometer.

The insulating layer may be a hydrophobic layer; alternatively, it may include a hydrophobic layer 15 and a barrier layer 16 with predetermined dielectric properties, the hydrophobic layer 15 facing the space 10, as shown in the Figure. The hydrophobic layer is schematically illustrated in FIG. 1 and may be formed of Teflon® AF1600. The barrier layer 16 may have a thickness, taken in a direction perpendicular the plane of the substrate, between 50 nanometers and 500 nanometers and may be made of an inorganic material like silicon oxide or silicon nitride.

The hydrophobic character of the surface 14 causes the first fluid 11 to adhere preferentially to the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element. The electrode 17 is electrically insulated from the first and second fluids by the insulating layer 13; electrodes of neighboring display elements are separated by a non-conducting layer. In some examples, further layers may be arranged between the insulating layer 13 and the electrode 17. The electrode 17 can be of any desired shape or form. In examples, each display element 2 may include more than one such electrode as part of the first support plate 5. The electrode 17 of a display element is supplied with voltage signals by a signal line 18, schematically indicated in the Figure.

The second support plate 6 includes a second electrode 19, which may extend between walls of a display element or extend uninterruptedly over a plurality of display elements 2, as shown in the Figure. The electrode 19 is in electrical contact with the conductive second fluid 12 and is common to all display elements. The electrode may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the center of the walls 21. The area of the surface 14 between the walls of a display element, indicated by the dashed lines 22 and 23, is called the display area 24, over which a display effect occurs. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element.

The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

Figure 2:
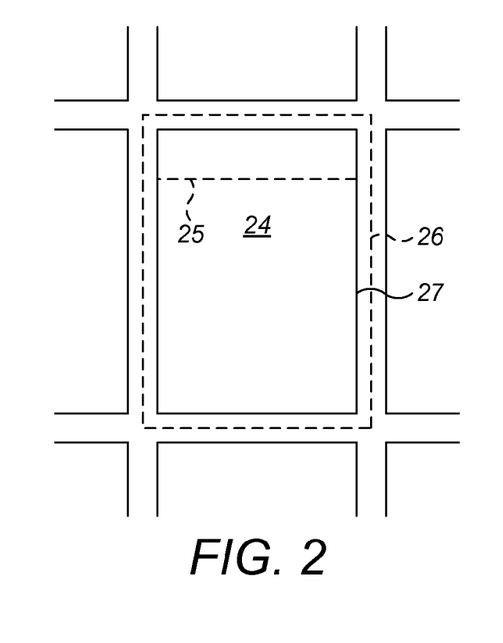
FIG. 2 shows a plan view of the example display element.

FIG. 2 shows a matrix of rectangular picture elements in a plan view of the hydrophobic surface 14 of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 24.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a color display device, the display state may also include color.

Figure 3:
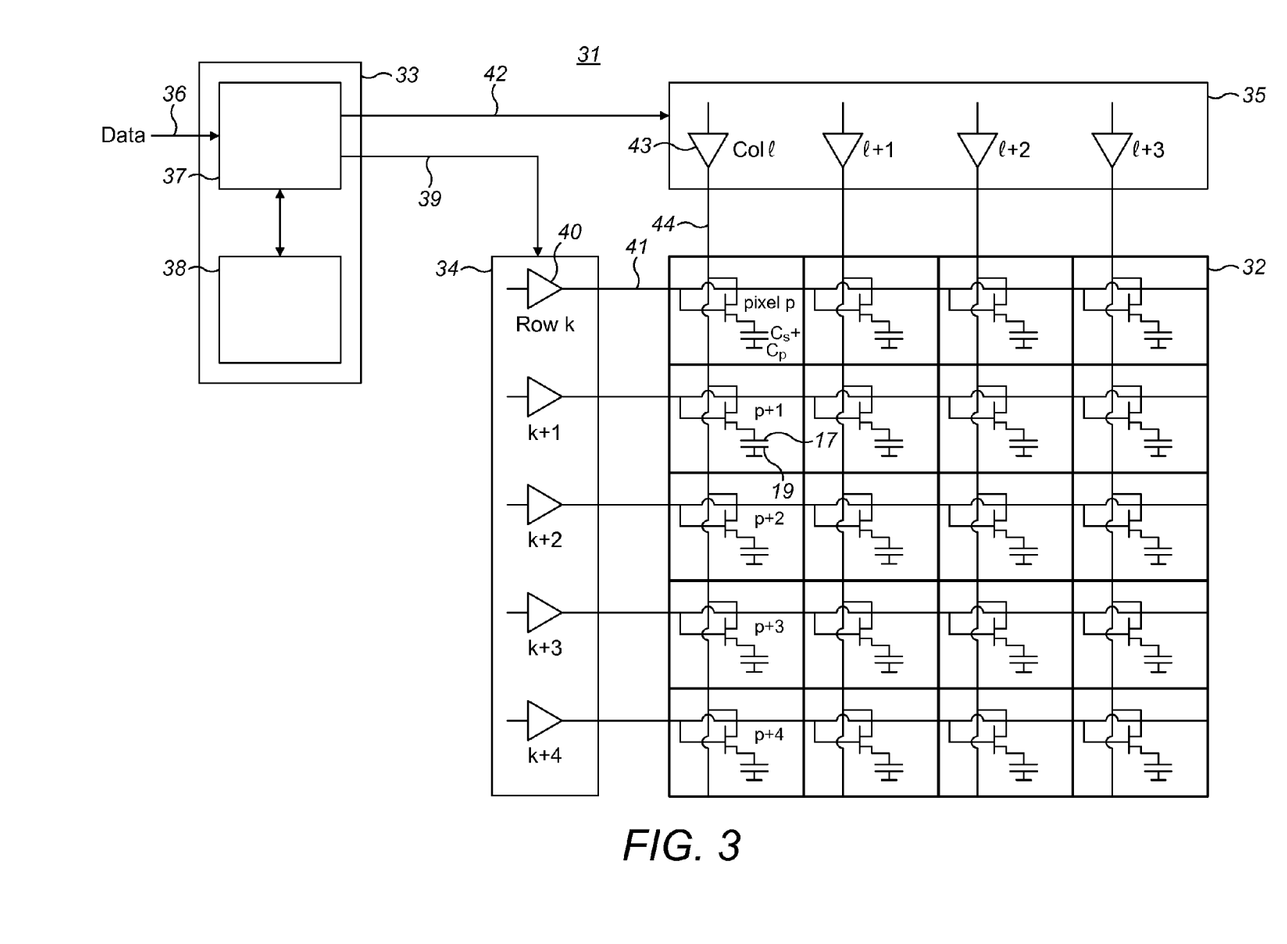
FIG. 3 shows schematically an example of an active matrix display apparatus.

FIG. 3 shows schematically an example electrowetting display apparatus 31. In this example of a so-called active matrix drive type the display apparatus includes a display driving system and a display device 32. The display driving system is for example part of a display device control subsystem described later and in this example includes a display controller or controller 33, a display row driver 34 and a display column driver 35. Data indicative of display states of the display elements, the display states for example representing a still image or video images, is received via an input line 36 to the display driving system. The display controller includes a processor 37 for processing the data entered via the input line 36. The processor is connected to at least one memory 38. The display controller prepares the data for use in the display device.

The at least one memory may store computer program instructions that are configured to cause the display apparatus to perform one or more of the methods of controlling a display device as described when being executed by the processor. The computer program instructions may be stored on a computer program product including a non-transitory computer-readable storage medium.

An output of the processor 37 is connected by line 39 to the display row driver 34, which includes row driver stages 40 that transform signals to the appropriate voltages for the display device 32. Row signal lines 41 connect the row driver stages to respective rows of the display device 32 for transmitting the voltage pulses generated in the display row driver to display elements in each row of the display device, thereby providing a row addressing signal to each row of the display device. In other words, one or more voltage pulses for addressing one or more rows is transmitted over the row signal lines 41 corresponding to the rows to switching elements corresponding respectively to the display elements in the one or more rows. The display row driver 34 generates the voltage pulses used for addressing the rows of the display device, using information from the processor 37 to set a value of the pulse duration of the voltage pulses.

Another output of the processor 37 is connected by line 42 to the display column driver 35, which includes column driver stages 43 that transform signals to the appropriate voltages for the display device 32. Column signal lines 44 connect the column driver stages to the columns of the display device 32, providing a column signal to each column of the display device.

The display controller 33 determines which rows are selected for addressing and in which order. The selected rows are consecutively addressed by applying an addressing signal to each of these rows. The addressing may include the steps of determining a value for a first pulse duration corresponding to at least one voltage pulse to be applied to a row of display elements, generating the at least one voltage pulse having the first pulse duration and transmitting the at least one voltage pulse to the rows to be addressed. In examples where the display elements of a row are connected to the same row signal line, addressing a row means addressing each display element of that row. When a display element is being addressed, the display element admits the column signal that is applied to the column signal line to which the display element is connected. The column signal for a display element is applied substantially simultaneously with the voltage pulse used for addressing the display element. Substantially simultaneously means that the column signal is present on the column signal line for at least the pulse duration of the voltage pulse.

The display drivers may comprise a distributor, not shown in FIG. 3, for distributing data input to the display driver over a plurality of outputs connected to the driver stages. The distributor may be a shift register. FIG. 3 shows the signal lines only for those columns and rows of the display device that are shown in the Figure. The row drivers may be integrated in a single integrated circuit. Similarly, the column drivers may be integrated in a single integrated circuit. The integrated circuit may include the complete driver assembly. The integrated circuit may be integrated on the support plate 5 or 6 of the display device. The integrated circuit may include part or the entire display device control subsystem.

The display device 32 comprises a plurality of display elements arranged in a matrix of n rows, where n may be ≥2, i.e. larger than one. The matrix may have an active matrix configuration. The matrix may have m columns, where m may be ≥2; the total number of display elements in this example is n×m. FIG. 3 shows display elements for five rows, labelled k to k+4 and four columns labelled 1 to 1+3. The total number of rows and columns for common display devices may range between a few hundred and a few thousand. The display elements, also called pixels, of column 1 are labelled p to p+4. Each display element may have the same construction as the display element 2 in FIG. 1.

FIG. 3 shows a few electrical parts of the display elements. Each display element of the display device 32 includes an active element in the form of one or more switching elements. The switching element may be a transistor, for example a thin-film transistor (TFT), or a diode. The electrodes of the display element are indicated as a pixel capacitor Cp formed by electrodes 17 and 19. A line connecting the electrode 19 of the capacitor to ground is the common signal line 20 and the line connecting the electrode 17 of the capacitor to the transistor is the signal line 18 shown in FIG. 1. The display element may include a capacitor Cs for storage purposes or for making the duration of the holding state or the voltage applied to the element uniform across the display device. This capacitor is arranged in parallel with Cp and is not separately shown in FIG. 3. The column drivers provide the signal levels corresponding to the input data for the display elements. The row drivers provide the signals for addressing the row of which the elements are to be set in a specific display state. In examples, addressing a row means applying a signal on the signal line of the row that switches a transistor of each of the display elements of the row to a conducting state of the transistor. Each row of the n rows of the display device is addressable by a signal such as a voltage pulse; the voltage pulse is applied to a switching element of each of the display elements in the addressed row for switching the switching element.

The addressing of rows is part of the addressing of display elements in an active matrix display device. A specific display element is addressed by applying a voltage to the column in which the specific display element is located and applying a voltage pulse to the row in which the specific display element is located.

When the transistor of a display element receives at its gate a voltage pulse of its row addressing signal, the transistor becomes conducting and it passes the signal level of its column driver to the electrode 17 of the electrowetting cell. In examples, a voltage pulse is a rapid, transient change in the voltage from a baseline value to a higher or lower value, followed by a rapid return, i.e. change, to the baseline value. The time period between the two subsequent voltage changes of the voltage pulse is called a pulse duration. After the transistor has been switched off, so the transistor is no longer conducting, the voltage over the cell will be substantially maintained until the transistor is switched on again by the next row addressing signal for the display element. The time during which the transistor is switched off is called the holding state of the element. In this active matrix driving method the electrodes of the electrowetting cells are connected to the driving stages briefly at the start of a period during which they show a certain display effect. During this connection, a voltage related to the desired display effect is applied to the electrodes. After the display element is disconnected from the driver stage, the voltage on the electrodes is substantially maintained by one or more capacitors during the period during which the display element shows the display effect. The method is called 'active', because the display element contains at least one active element, for example a transistor.

Figure 4:
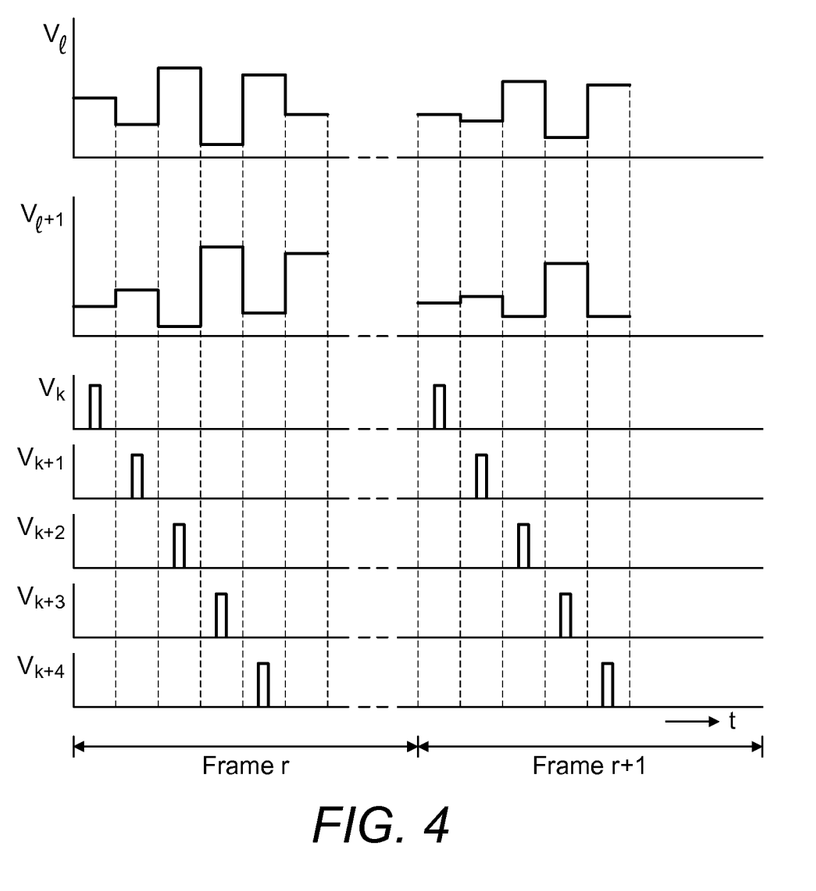
FIG. 4 shows a diagram of an active matrix driving method.

FIG. 4 shows a diagram of an example method of driving the display elements in a display device having an active matrix configuration. The method displays images during a series of frames, for example, an image is displayed within the duration of one frame. During a frame all display elements of a display device may be addressed; in a matrix all rows of the matrix of a display device are addressed during a frame. FIG. 4 shows two column signals V1 and V1+1 and five row addressing signals Vk . . . Vk+4 as a function of time t for two consecutive frames r and r+1. The duration of a frame or frame period is Tf. In examples, a frame period Tf is a pre-determined period for addressing the n rows of the matrix. In some examples the frame period is the period between consecutive addressing the same row. The duration of the period may be fixed, i.e. programmed, in the controller 33.

When row k is selected and addressed by a pulse on the row addressing signal Vk, as shown at the start of frame r in FIG. 4, the transistor in each display element of row k becomes conducting and the voltages on each of the column signal lines 44 will be put on the electrode 17 of each display element in row k. Subsequently, the display column driver 35 of FIG. 3 changes the voltages on the column signal lines to the values required for row k+1. When row k+1 is selected by a pulse on row addressing signal k+1, the voltages are put on the electrode 17 of FIG. 1 of the display elements of row k+1. All n rows of the display device will be selected consecutively in a similar manner in frame r. The process of selecting the rows starts again in the following frame r+1.

In examples of common display apparatuses the pulse duration of the voltage pulse of the row addressing signal, also called the gate period Tg or gate time, is such that the n rows of the display device can be addressed consecutively within one frame period. Common display apparatuses have therefore usually a pulse duration equal to or less than Tf/n. For example, addressing 1000 rows in a frame period of 20 milliseconds requires a pulse duration of 20 microseconds or less.

FIGS. 5, 5a, 5b and 5c will now be used to describe further details of the example of FIG. 1, specifically further details of electrical circuitry within the electrowetting element.

Figure 5:
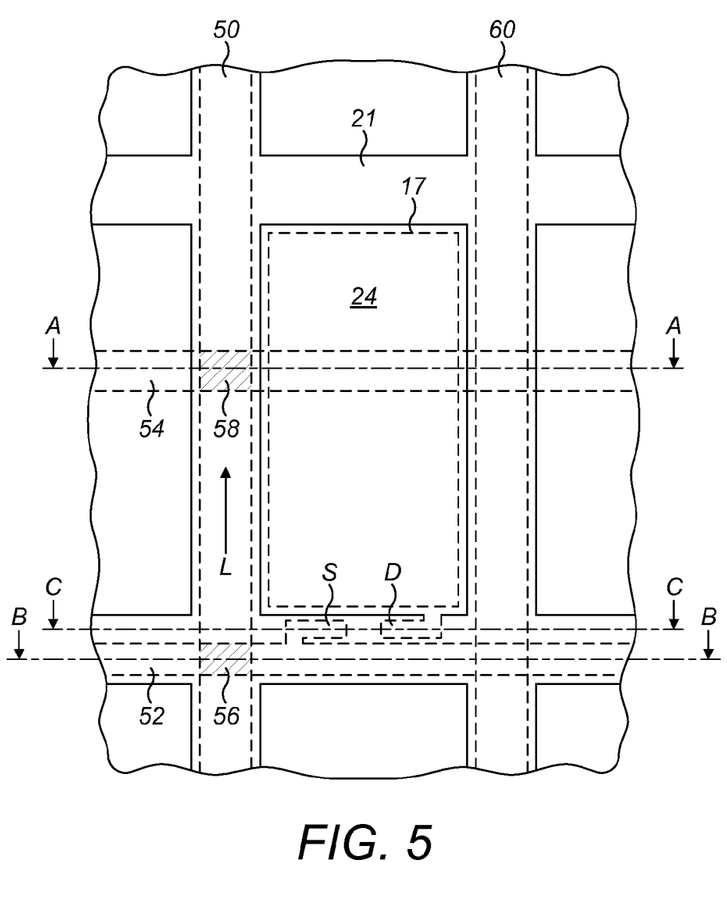
FIG. 5 shows a plan view of an example electrowetting display element, with FIGS. 5a to 5c showing cross-section views of that example.

FIG. 5 shows a plan view of the example of an electrowetting display element described using FIG. 1. The display area 24 is shown. An extent of the electrode 17 is shown with a dashed line. It is to be appreciated that a dashed line indicates a structure lying below the plane of the drawing. In some examples, the electrode 17 is formed at least partly of a metallic material and is reflective. Therefore, the electrode 17 is in such examples a reflector for providing the display element with a reflective functionality. The walls 21 are shown surrounding a perimeter of the display area 24.

The electrowetting device includes a plurality of electrical elements for use in providing the applied voltage in at least one of the display elements. It is to be appreciated that further electrical elements may be present than those illustrated, for applying voltages to further display elements, in accordance with an active matrix configuration for example. An electrical element is considered in examples to be an electrical connector, member, structure, trace, line, contact, path, conductor, or electrode for conducting electricity.

In examples, for example that of FIG. 5, the plurality of electrical elements is a plurality of electrical connectors including a first electrical connector 50 and a second electrical connector 52 though it is to be appreciated that in different examples the plurality of electrical elements may be different types of electrical element. In the example of FIG. 5, the plurality of electrical connectors includes at least one further electrical connector 54. In examples, the first electrical connector is for example a column signal line 44 described previously. In other words, the first electrical connector is a source line or connector, for connection to the source of a TFT, or in other examples a diode. In examples, the second electrical connector is for example a row signal line 41 described previously, i.e. a gate line or connector, for connection to the gate electrode of a TFT. The further electrical connector is for example a common signal line 20 described previously. It is to be noted that although the first, second and further electrical connectors correspond with the source, gate and common signal lines, in further examples electrical connectors may correspond with other types of electrical connectors than those described herein, or the first, second and further labels may be used in further examples to refer to different types of electrical connectors. A further first electrical connector 60 is illustrated, associated with an adjacent column of electrowetting display elements.

Any of the plurality of electrical connectors described herein may for example be formed as a strip of metal, for example having an elongate and flattened form, i.e. a form which is relatively thin in thickness compared with a length and width dimension. A form of at least one electrical connector and/or the underlying dielectric layer may follow a perimeter of an electrowetting element, which may have any shape of a polygon.

At least one of the plurality of electrical connectors overlaps a different one of the plurality of electrical connectors. In examples, for example that of FIG. 5, a portion, i.e. a part, of the first electrical connector 50 is overlapping a portion of the second electrical connector 52. A region of overlap 56 is illustrated using shading in FIG. 5. This region may otherwise be considered an area or an extent of overlap. The term overlap may in examples be considered to indicate one element at least partly covering a different element, so in this example the portion of the first electrical connector covers, for example lies over, the portion of the second electrical connector. In examples, there may be at least one layer or material, for example a dielectric layer as explained below, or a void, between the overlapping elements.

In the example of FIG. 5, a further portion of the first electrical connector 50 overlaps a portion of the further electrical connector 54. This region of overlap 58 is also illustrated with shading.

With the portions of the first and second electrical connectors overlapping, a parasitic capacitance may occur, which may increase a power consumption of the electrowetting device. Therefore, to reduce this parasitic capacitance, the electrowetting device in examples comprises a dielectric layer (not illustrated in FIG. 5) between the portion of the first electrical connector and the portion of the second electrical connector. The dielectric layer is formed at least partly, for example formed solely, of a dielectric material having a dielectric constant of less than 3.9, which value is the dielectric constant of silicon dioxide, i.e. $SiO_2$.

In examples, the dielectric material comprises a silicon oxide, which in examples is a material including Si—O bonds. In further examples, the dielectric material described herein comprises carbon (C) and a silicon oxide, i.e. a compound of silicon (Si) and oxygen (O) with Si—O bonds, the silicon of the silicon oxide being at least part of the silicon of the material. The dielectric material may for example have the formula SiOCF. This formula represents the atoms comprised by the material and not the precise proportions of each element, i.e. the number of atoms of each element, as this depends on the proportion of reagents used when forming the material, and manufacture conditions, as will be explained in further detail below. The notation SiOCF will be readily understood by the skilled person. In some examples, the SiOCF material comprises a silicon oxide matrix with voids in the matrix occupied with one or more carbon (C) and/or fluorine (F) atoms. In some examples of a SiOCF material, it may be considered that a silicon oxide is doped with C and/or F atoms. It is noted that the dielectric material may or may not include hydrogen (H) atoms, depending on the method of forming the dielectric material and/or the reagents used to form the dielectric material. Therefore, in some examples, the SiOCF material may include H atoms, for example in the form of Si—OH bonds; such a compound may be denoted SiOCF:H.

The dielectric material, for example SiOCF, described herein has suitable dielectric properties to function as a dielectric material. In other words, the dielectric material may be considered to have a sufficiently low "k" value, i.e. dielectric constant value, which "k" value may be represented instead with the Greek letter kappa as will be appreciated by the skilled person and is known in the art. This dielectric property may be accurately controlled during manufacture, as will be described further below. In examples, the dielectric material has a k value between approximately 2 and 3, for example between 2 and 3, with a value of for example approximately 2.5, for example 2.5.

It is envisaged in further examples that the dielectric material may instead include, for example be at least partially formed of, other dielectric materials including silicon and fluorine. Such other dielectric materials include SiOF, which is similar to SiOCF but without carbon atoms; in other examples the material may include silicon, fluorine and nitrogen (N) in the form SiNF, with Si—N bonds. In further examples the material may include SiONF, with Si—O bonds and nitrogen and fluorine, for example including Si—N bonds.

The dielectric layer in some examples is a single layer separating the overlapping portions of the first and second electrical connectors respectively. In other examples, the dielectric layer is one of a plurality of layers between the overlapping portions of the first and second electrical connectors.

Figure 5A:
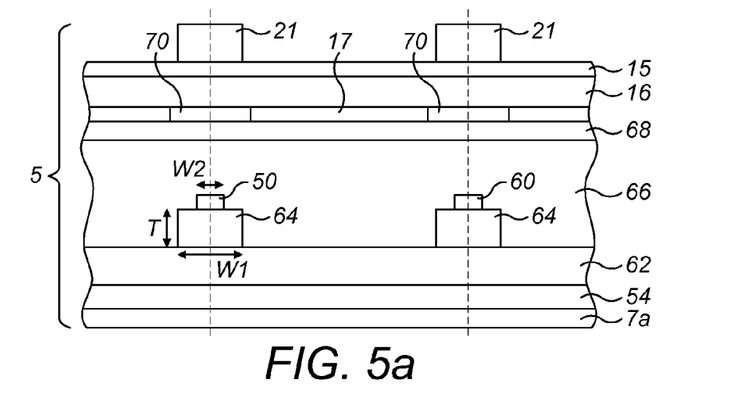
Figure 5B:
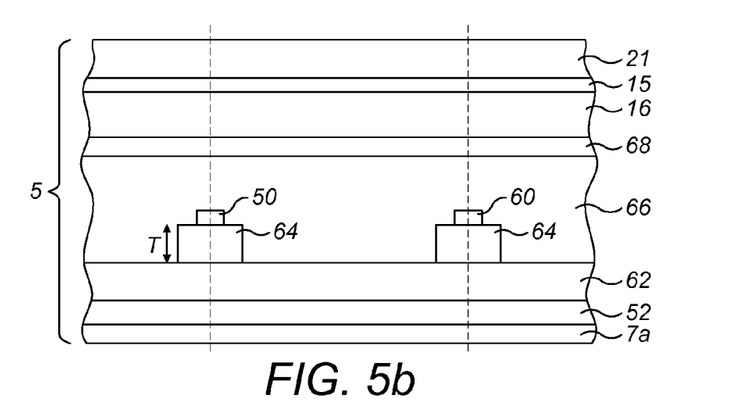
Figure 5C:
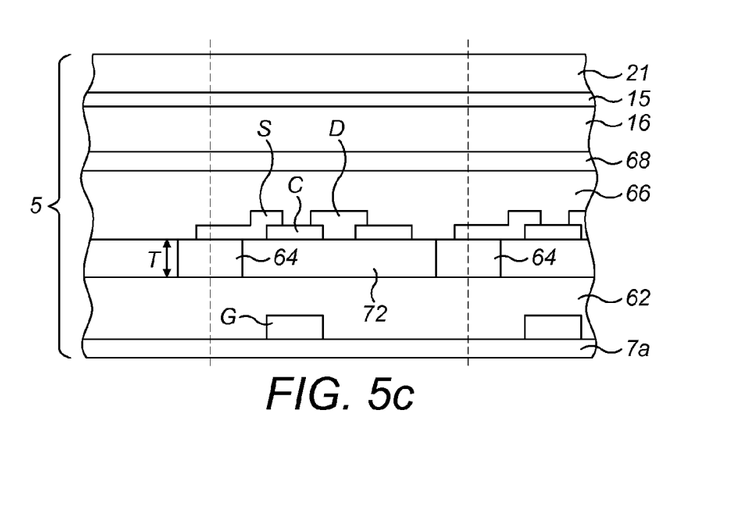

FIGS. 5a to 5c show three cross-sections of the electrowetting display element of FIG. 5, taken respectively along the cross-section planes A-A, B-B and C-C indicated in FIG. 5. Each cross-section shows the layers of the first support plate according to the example of FIG. 5. Features of the example of FIG. 1 are also shown here, although these cross-sections are more detailed than the cross-section of FIG. 1 to illustrate the circuitry for controlling the applied voltages.

Referring to FIGS. 5a and 5b, layers of the first support plate 5 are described in order of stacking, starting from the substrate 7a. On the substrate 7a is formed, in order in the stack, the second electrical connector 52 (see FIG. 5b) and the further electrical connector 54 (see FIG. 5a), a dielectric layer 62 formed of for example silicon dioxide or silicon nitride, dielectric layers 64 formed of the dielectric material with a dielectric constant of less than 3.9 described above and having shape and dimension properties as described below. First electrical connectors 50, 60 are formed on the dielectric layers 64. The dielectric layers 64 are therefore each located between a first electrical connector 50, 60 and the further electrical connector 54 in FIG. 5a or the second electrical connector 52 of FIG. 5b. On the exposed parts of the dielectric layer 62 and on and at least partly surrounding the first electrical connectors and the dielectric layer 64 is formed a further dielectric layer 66 of for example silicon dioxide or silicon nitride. This further dielectric layer may include the layer 72 described later in relation to FIG. 5c. On the further dielectric layer 66 is formed (though in other examples this layer may not be present) a layer of an organic material 68 for example, which may have a shape for influencing a topographical shape of the display element above the further dielectric layer 66. On the layer of organic material 68 is then formed, in the appropriate location, the electrode 17. Adjacent electrodes of different electrowetting elements are separated from each other by for example non-conducting material 70 to avoid short circuits between adjacent electrodes. On the layer including the electrodes, there is in turn the barrier layer 16, the hydrophobic layer 15 and then the walls 21 for example.

In examples, the electrowetting device comprises a transistor associated with the electrowetting element illustrated in FIG. 5. The transistor may for example be a TFT as described previously with reference to FIG. 3 and is used for controlling providing of an applied voltage on the electrowetting element, specifically for example between the electrodes 17, 19. FIG. 5c shows a cross-section through a region of the electrowetting device including the TFT. Features in this section are similar to those in FIG. 5b, so for FIG. 5c the features not present in FIG. 5b will be described. The transistor comprises a source S, otherwise known as a source electrode, a drain D, otherwise known as a drain electrode, and a channel C connecting the source to the drain. A gate electrode G at least partly overlaps with and is separated from the channel C by at least one transistor dielectric layer.

The gate electrode G is for example formed of a layer of electrically conductive metal on the substrate 7a. The dielectric layer 62 formed on the substrate 7a is also formed over the gate electrode G. In a region between the gate electrode G and the channel C, a further dielectric layer 72 is formed, for example of silicon nitride or silicon dioxide. In this region between the gate electrode and the channel, the dielectric layer 62 and further dielectric layer 72 may be referred to as at least one transistor dielectric layer. The channel may be formed of a semiconducting material such as amorphous silicon and the drain, source and gate terminals may for example be formed of any of molybdenum (Mo), an alloy including molybdenum (Mo) and chromium (Cr), or aluminium (Al).

In examples, including that of FIGS. 5, 5a, 5b and 5c, the dielectric layer 64 between the portions of the first and second electrical connectors, including in this example the dielectric layer between the portion of the first and further electrical connectors, is outside the region occupied by the transistor dielectric layer. In other words, the dielectric layer 64 does not even partially overlap with the channel C or the gate electrode G. Further, the transistor dielectric layer does not in examples partially or fully overlap with, i.e. cover, any portion of the first electrical connector which overlaps with a portion of the second or further electrical connectors (see respectively regions of overlap 56, 58). Referring to FIG. 5, an example formation of the source S and drain D are shown, connecting respectively from the second electrical connector 52 and to the electrode 17. The drain D may be connected to the electrode 17 with a via or a contact hole, i.e. a connection through at least one layer of the support plate.

To enable correct function of the transistor, the transistor dielectric layer may be formed at least partly of a dielectric material with a high k value, for example a k value exceeding 3.9. Therefore, with the dielectric material 64 being formed outside of the region occupied by the transistor dielectric layer, the reduction in parasitic capacitance between overlapping portions of the first, second and/or further electrical connectors may be obtained in addition to a transistor having a suitable operation by use of the high k value.

Shape, dimensional and other properties of the dielectric layer 64 between the portion of the first electrical connector and the portion of the second electrical connector will now be described. It is to be appreciated that such features in some examples apply also, or independently, to overlapping portions of the first and further electrical connectors.

In examples, for example that of FIGS. 5, 5a, 5b, 5c, an extent of the dielectric layer 64 between the portion of the first electrical connector and the portion of the second electrical connector is greater than an extent (shaded in FIG. 5 and labelled 56) of the portion of the first electrical connector overlapping the portion of the second electrical connector. The plane of each of these extents are substantially parallel to each other, for example parallel within acceptable manufacturing tolerances of the dielectric layer and the first and second electrical connector. Further, the plane of each of these extents is for example parallel to a plane of the display area 24.

With the greater extent of the dielectric layer, at least part of the dielectric layer extends from beneath the first electrical connector, for example so that a part of the dielectric layer 64 is not overlapped by the first electrical connector. With the dielectric layer 64 having this greater extent in examples, there is a further reduction of parasitic capacitance, as fringing fields between the first and second electrical connectors and which contribute to the parasitic capacitance may be obstructed and therefore reduced. A fringing field for example has field lines with an orientation which may be curved rather than straight lines between the first and second electrical connectors. Therefore, with the dielectric layer 64 having the greater extent, more of these field lines can be blocked.

In some examples, a width W1 of the dielectric layer 64 is greater than a width W2 of the portion of the first electrical connector overlapping the portion of the second electrical connector. This greater width helps to reduce fringing fields and therefore reduces a parasitic capacitance. Further, the greater width may also help reduce cross talk effects between the second electrical connector and the electrode 17 when it is for example a reflector. The width of the dielectric layer need not be constant along the length of the dielectric layer; for example the dielectric layer may be wider where the first and second electrical connectors overlap for example and thinner along lengths of the dielectric layer in between regions of overlap of electrical connectors.

In other examples, in some of which the width W1 is greater than the width W2 too, as described above, a length of the dielectric layer is greater than a length of the portion of the first electrical connector overlapping the portion of the second electrical connector. A length axis L is indicated in FIG. 5 as a longitudinal axis of the first electrical connector. It is to be appreciated that in other examples, for example where the dielectric layer may be formed along a length of the second electrical connector, the length axis L may instead be a longitudinal axis of the second electrical connector. The length axis denotes a length direction which in examples is perpendicular to a width direction which widths referred to herein are defined along or parallel to. A plane defined by the width and length axes is for example parallel to a plane of the extent of overlap of the portions of the first and second electrical connectors.

In some such examples, the extent of the dielectric layer within the electrowetting element (an extent of the electrowetting element corresponding with the dashed line 26 in FIG. 2) is less than the extent of the electrowetting element, these extents being taken in a planes substantially parallel to each other. In some examples, the extent of the dielectric layer within the electrowetting element is at least substantially equal to an extent of the first electrical connector within the electrowetting element. Substantially for example means greater than 90% or greater than 95%. Thus, the extent of the dielectric layer may extend along the length of the first electrical connector for more than one electrowetting element and may in some examples extend along substantially the whole length of the first electrical connector, for example along 50%, 60%, 70%, 80%, 90% or more of the whole length of the first electrical connector. The dielectric layer may therefore be elongate in shape. In some such examples the width W1 may also be greater than the width W2 as previously described. With the extent of the dielectric layer being at least substantially equal to the extent of the first electrical connector within the electrowetting element, substantially all of the first electrical connector is located on the dielectric layer, such that the first electrical connector is for example substantially completely supported by the dielectric layer within the electrowetting element. Substantially used here for example means greater than 90% or greater than 95%. In examples, the first electrical connector is fully supported by the dielectric layer along substantially the whole length of the first electrical connector. This is beneficial in examples. As the parasitic capacitance occurs in a region of overlap between portions of the first and second electrical connectors, one option is to form the dielectric layer with an extent which corresponds with the extent of the overlap of the portions of electrical connectors. However, the inventors have realised that with for example the first electrical connector being substantially completely supported by the dielectric layer, there are further benefits beyond reducing parasitic capacitance. In such examples, the dielectric layer is a single continuous layer of the dielectric material, for example having a substantially uniform thickness, for example uniformly thick within acceptable manufacturing tolerances. The substantially uniform thickness may lie along at least one of a length or a width of the dielectric layer; a thickness T of the dielectric layer is shown in the FIGS. 5*a* to 5*c* and may for example be approximately 200 to 500 manometers, for example 200 to 500 manometers depending on the thickness required to reduce parasitic capacitance. With the thickness being substantially uniform, a surface of the dielectric layer on which the first electrical connector is formed during manufacture is substantially planar, i.e. flat. Substantially here means for example within acceptable manufacturing tolerances. Thus the first electrical connector may be formed also with a substantially uniform thickness. As it is often desirable to form electrical connectors with a minimum thickness, whilst also providing suitable functionality, the ability to form a substantially uniform thickness first electrical connector reduces the chances of breaks or discontinuities in the first electrical connector along its length. This improves a performance of the connector and also facilitates a reduced size of the display, as a thinner electrical connector may be formed without compromising its performance. In contrast, in examples where the dielectric material may be provided only between the overlapping portions of the first and second electrical connectors, rather than the dielectric layer for example extending along a length of the first electrical connector, discrete formations, which could be considered to be islands, of the dielectric material are formed along the length of the first electrical connector. Thus, when forming the first electrical connector over these formations, the resulting first electrical connector would have a cross-sectional profile along its length which rises and falls depending on whether the connector material is covering a formation of dielectric material or not. These rises and falls can cause thinning of the connector material for example at a transition from a rise to a fall, which can compromise performance of the connector and even in some cases cause breaks to occur during the lifetime of the device.

In examples, the width W1 of the dielectric layer is one of at least substantially equal to a width of one of the first electrical connector or the second electrical connector, or at least twice the width of one of the first electrical connector or the second electrical connector. Substantially used here in examples means within acceptable manufacturing tolerances. The dielectric layer may therefore have a width W1 greater than the width W2 of the first electrical connector.

For example, where the width W1 is twice the width W2 of the first electrical connector, parasitic capacitance may be reduced by a factor of four.

As will be appreciated, for a matrix configuration for example, as explained above, there may be a plurality of rows of electrowetting elements which each comprise a plurality of electrowetting elements, for example the electrowetting element described above with reference to FIGS. 1, 2, 5 and 5a to 5c. In such a configuration, the plurality of electrical connectors for example includes a plurality of the second electrical connector, for example the gate signal line, with at least one respective one of the plurality of second electrical connectors being associated with a respective row of the plurality of rows, as will be appreciated for example from FIG. 3. The plurality of second electrical connectors may include the second electrical connector 52. Therefore, for a column of electrowetting elements in the matrix, different portions of the first electrical connector overlap a portion of a respective one of the plurality of second electrical connectors. This may include the portion overlapping the second electrical connector 52 in FIG. 3. In such examples, the dielectric layer is located between each of the different portions of the first electrical connector and the respective one portion of the plurality of second electrical connectors. For example the dielectric layer may be a single continuous layer as described above, for example a dielectric layer extending substantially along a length of the first electrical connector without extending substantially along a length of at least one of the plurality of second electrical connectors.

It is noted that although a matrix configuration is described herein with the second and further electrical connectors being associated with rows of electrowetting elements and with the first electrical connector being associated with columns of electrowetting elements, in further examples, the first electrical connector may be associated with a row or other configuration of electrowetting elements and the second and further electrical connectors may be associated with a column or other configuration of electrowetting elements.

In examples where at least one of the electrowetting element comprises a reflector as explained above, an extent of at least one of the plurality of electrical connectors within the electrowetting element is located in a region which is non-overlapping with the display area. In examples, non-overlapping may be taken to mean that the reflector does not cover or lie over any part of any of the electrical connectors. This therefore avoids any parasitic capacitance effects which may otherwise occur between the reflector and plurality of electrical connections. In further examples, including those illustrated using FIGS. 5 and 5a to 5c, the extent of at least one of the plurality of electrical connectors, for example any of the first, second and further electrical connectors, is at least partly covered by the wall of the electrowetting element. In this way, any effect by an electrical connector on a display effect provided by the electrowetting element may be reduced; for example, an electrical connector may be at least partially reflective for light and therefore positioning the electrical connector under the wall, i.e. so the wall overlaps the electrical connector, can reduce those reflective effects. Moreover, the electrical connector under a wall is less likely to influence motion of the fluids, which might otherwise interfere with an intended switching of the fluid configuration using the electrode 17. With at least some of the electrical connectors being covered by a wall and non-overlapping with a display area, at least one of the electrical connectors may follow a perimeter shape of the display area.

An example of a method of manufacturing a support plate for at least one electrowetting element will now be described with reference to features of FIGS. 1, 2, 5, 5a to 5c and 6. During the manufacturing process of the electrowetting element, for example of a display device, the first support plate may be manufactured entirely, or may be provided during the manufacturing process as a partly or completely assembled support plate. The skilled person will readily appreciate various masking, patterning and deposition techniques which may be used during this manufacture process.

When manufacturing the first support plate according to an example a structure such as the substrate 7a is provided. An electrical connector is formed on the structure by for example patterning a material for forming the electrical connector. This electrical connector may be at least one of the second and further electrical connectors described above, for example the gate signal lines and the common signal lines for a matrix of electrowetting elements. This patterning may also include forming the gate electrode of a TFT again as explained above. At least one dielectric layer, for example that labelled 62, may then be formed to cover the already formed electrical connectors. A further dielectric layer 64 may then be formed on the electrical connector (the term "on" being used to mean at least one of in contact with or supported by), for example on the dielectric layer 62. This further dielectric layer is formed of a dielectric material with a dielectric constant less than 3.9 and may be formed of SiOCF for example, as described above, and may be formed using a chemical vapour deposition (CVD) process which will is well known to the person skilled in the art. The CVD process may for example be a plasma enhanced CVD process (PECVD), again as is well known in the art. The precise structure of the dielectric material forming the dielectric layer, including for example the arrangement of atoms in the material, the types of bonds and the proportion of each type of atom (e.g. the number of atoms of each type), will depend on the proportion, e.g. the volume and/or concentration, of each precursor gas in the mixture, the precursor gases and process conditions and parameters, for example the frequency and power of the radiofrequency, pressure and temperature conditions, as the skilled person will understand. For example, a CVD process such as a PECVD process may include controlling a radiofrequency power to select a proportion of fluorine in the resulting dielectric material including silicon and fluorine, for example SiOCF. By tuning the process to select a desired proportion of fluorine in the material, a dielectric constant of the material may be controlled. It is noted that although controlling the radiofrequency power may influence the proportion of fluorine in the material, this controlling may also influence the proportion of carbon, silicon and/or oxygen in the material.

After forming a layer of the SiOCF material, for example, the layer may be patterned to obtain a desired layout of the dielectric layers. For example, a sacrificial layer may be applied on top of the dielectric layer according to the pattern desired and then areas of the dielectric layer which are not covered by the sacrificial material may be removed for example using reactive ion etching (RIE). After this and on removing the sacrificial material on the dielectric layer, the dielectric layers 64 are formed. These dielectric layers may be shaped and formed in accordance with of the examples described herein. Where the support plate includes a transistor, the dielectric layers 64 are in examples formed so as to be outside of a region occupied by a transistor dielectric layer, as for example described previously.

After forming the dielectric layers 64, an other electrical connector may then be formed on the dielectric layer, for example the first electrical connector, such that a portion of the other electrical connector overlaps a portion of the underlying electrical connector such as the second or further electrical connector. As the skilled person will readily understand a suitable example technique may be used for forming an electrical connector, for example by depositing metal for forming the electrical connector over the whole of the surface on which the electrical connector is to be formed on a part thereof, applying a photoresist, using a photo lithography technique to harden the photoresist in areas where the electrical connector is to be formed, removing the unhardened photoresist and then etching the deposited metal not covered by the photoresist.

After forming the first electrical connectors, further layers may be formed thereon to complete manufacture of the support plate. These include for example the further dielectric layer 68, the organic layer 68 which is for example an epoxy resin, forming the electrodes 17 according to a desired pattern, forming the barrier layer 16, forming the hydrophobic layer 15 and forming the walls 21. As will be appreciated, the walls may be formed for example by reducing a hydrophobicity of the hydrophobic layer using a reactive ion etching (RIE) process to increase a wettability of the surface for the walls to be formed. Then a photolithography technique may be used to apply a material for forming the walls for example a SU8 photoresist material, which would be well known to the skilled person. More specifically, a wall material may be spread across at least part of the surface of the layer on which the walls are to be formed and then patterned using for example photolithography with ultraviolet light applied selectively, using a mask, to the applied wall material. After then hard baking the patterned wall material, the patterned wall material is developed, leaving the formed walls, using an appropriate masking and development technique, as the skilled person will understand. Once the walls are formed, it may then be necessary in examples to increase the hydrophobicity of the surface for the display area, given the previous RIE treatment.

Once the first support plate is manufactured it may be assembled with a pre-manufactured second support plate, to assemble one or more electrowetting elements by attaching the first and second support plates together, for example using an adhesive seal at an outermost perimeter of an array of the one or more electrowetting elements, after having provided the first and second fluids in the space to be formed between the first and second support plates. The skilled person will readily appreciate suitable techniques for this.

It is to be noted that the phrase "wall material" is used to cover a material from which at least one wall is to be formed, for example a pre-cursor wall material, a material which forms at least one wall after a wall formation process and any intermediate material formed during formation of at least one wall. It is also to be appreciated that in further examples, other manufacturing methods may be used to manufacture the first support plate.

Figure 6:
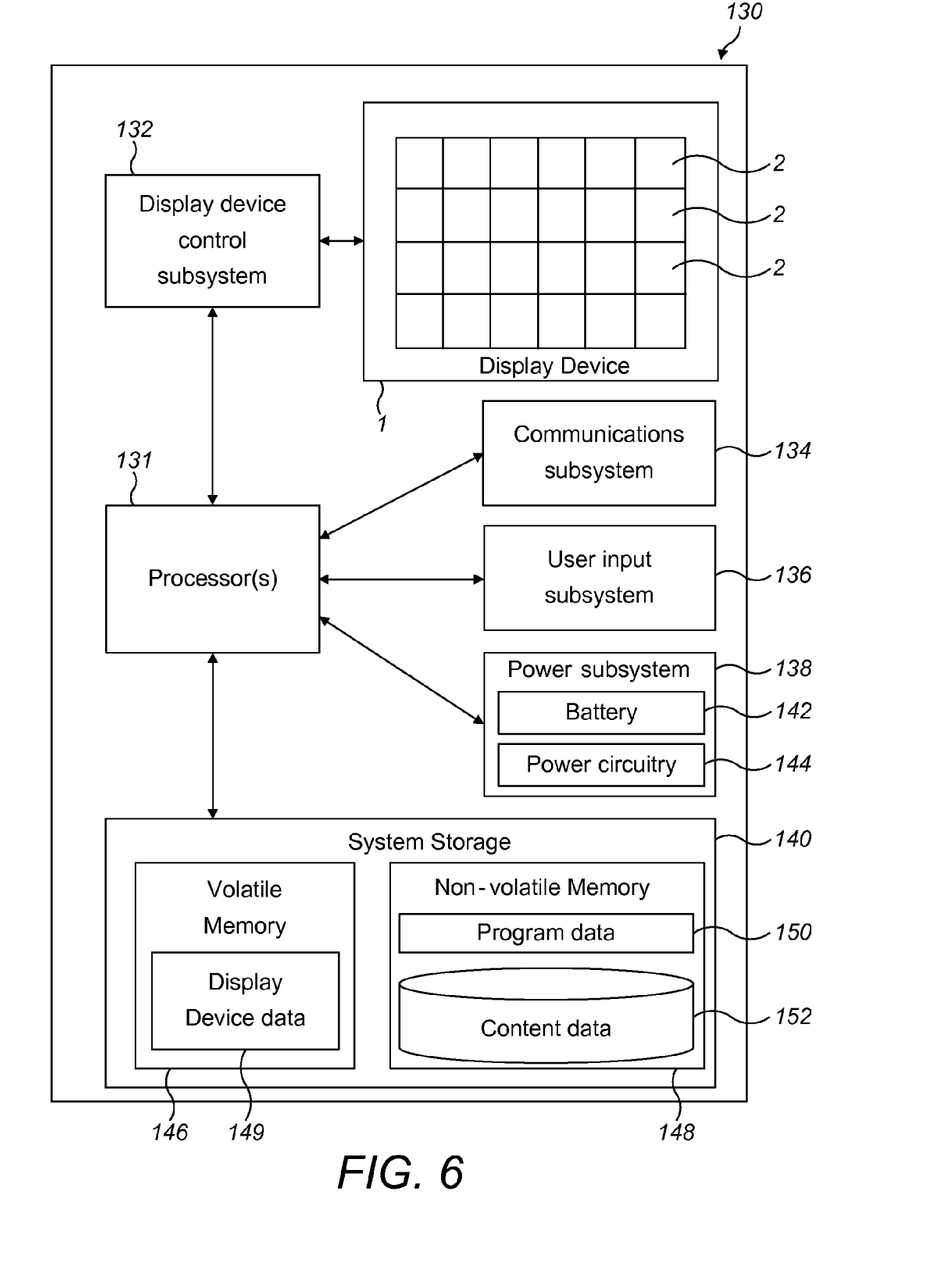
FIG. 6 shows a schematic system diagram of an example apparatus including an electrowetting display device.

FIG. 6 shows schematically a system diagram of an example system, for example apparatus 130, comprising an electrowetting display device such as the electrowetting display device 1 described above comprising electrowetting display elements 2. The apparatus is for example a portable, i.e. mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 130. The apparatus includes at least one processor 131 connected to and therefore in data communication with for example: a display device control subsystem 132, a communications subsystem 134, a user input subsystem 136, a power subsystem 138 and system storage 140. The display device control subsystem is connected to and is therefore in data communication with the display device 1. The at least one processor 131 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 140. The at least one processor may additionally, or in the alternative, contain memory, such as processor registers.

The display device control subsystem 132 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 134 for example is configured for the apparatus to communicate with for example a computing device via a data network, for example a computer network such as the Internet, a local area network, a wide area network, a telecommunications network, a wired network, a wireless network, or some other type of network. The communications subsystem 134 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 136 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 138 for example includes power circuitry 144 for use in transferring and controlling power consumed by the apparatus. The power may be provided by a mains electricity supply or from a battery 142, via the power circuitry. The power circuitry may further be used for charging the battery from a mains electricity supply.

The system storage 140 includes at least one memory, for example at least one of volatile memory 146 and non-volatile memory 148 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 6, the volatile memory 146 stores for example display device data 149 which is indicative of display effects to be provided by the display device 1. The processor 131 may transmit data, based on the display device data, to the display device control subsystem 132 which in turn outputs signals to the display device for applying voltages to the display elements, for providing display effects from the display device. The non-volatile memory 148 stores for example program data 150 and/or content data 152. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

The above embodiments are to be understood as illustrative examples. Further examples are envisaged. It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting device comprising:
an electrowetting element comprising:
a first fluid;
a second fluid immiscible with the first fluid; and
a support plate comprising;
an electrode, a configuration of the first fluid and the second fluid controllable with an applied voltage between the electrode and the second fluid;
a plurality of electrical elements for use in provision of the applied voltage, the plurality of electrical elements comprising a first electrical element and a second electrical element, a first portion of the first electrical element overlapping a second portion of the second electrical element; and
a dielectric layer at least partly comprising a dielectric material having a dielectric constant less than 3.9.

2. The electrowetting device according to claim 1, wherein an extent of the dielectric layer is greater than an extent of the first portion of the first electrical element, the extent of the dielectric layer being taken in a plane substantially parallel to a plane of the extent of the first portion of the first electrical element.

3. The electrowetting device according to claim 1, wherein a width of the dielectric layer is greater than a width of the first portion of the first electrical element, the width of the dielectric layer being taken in a direction substantially parallel to a direction of the width of the first portion of the first electrical element.

4. The electrowetting device according to claim 1, wherein a length of the dielectric layer is greater than a length of the first portion of the first electrical element, the length of the dielectric layer being taken in a direction substantially parallel to a direction of the length of the first portion of the first electrical element.

5. The electrowetting device according to claim 1, wherein an extent of the dielectric layer within the electrowetting element is at least substantially equal to an extent of the first electrical element within the electrowetting element, and substantially all of the first electrical element is located on the dielectric layer, the extent of the dielectric layer being taken in a plane substantially parallel to a plane of the extent of the first electrical element.

6. The electrowetting device according to claim 1, wherein the dielectric layer comprises a single continuous layer having a substantially uniform thickness and at least partly comprising the dielectric material.

7. The electrowetting device according to claim 1, wherein a width of the dielectric layer is one of: at least substantially equal to a width of one of the first electrical element or the second electrical element; or at least twice the width of one of the first electrical element or the second electrical element.

8. The electrowetting device according to claim 1, comprising a plurality of rows each respectively comprising a plurality of the electrowetting element,
   the plurality of electrical elements comprising a plurality of the second electrical element, at least one respective second electrical element of the plurality of the second electrical element being associated with a respective row of the plurality of rows,
   wherein a different portion of the first electrical element overlaps a second portion of a different one of the plurality of the second electrical element, and
   wherein the dielectric layer is located between the different portion of the first electrical element and the second portion of the different one of the plurality of the second electrical element.

9. The electrowetting device according to claim 8, wherein the dielectric layer extends substantially along a length of the first electrical element without extending substantially along a length of at least one of the plurality of the second electrical element.

10. The electrowetting device according to claim 1, wherein an extent of the dielectric layer within the electrowetting element is less than an extent of the electrowetting element, the extent of the dielectric layer being taken in a plane substantially parallel to a plane of the extent of the electrowetting element.

11. The electrowetting device according to claim 1, comprising a transistor associated with the electrowetting element for use in control of provision of the applied voltage, the transistor comprising a gate electrode, a source, a drain, and a channel connecting the source to the drain, the gate electrode being separated from the channel by at least one transistor dielectric layer, the dielectric layer between the first portion of the first electrical element and the second portion of the second electrical element located outside of a region occupied by the at least one transistor dielectric layer.

12. The electrowetting device according to claim 1, the electrowetting element comprising a display area for adjoinment by at least one of the first fluid or the second fluid in dependence on the applied voltage, an extent of at least one of the plurality of electrical elements within the electrowetting element located in a region which is non-overlapping with the display area.

13. The electrowetting device according to claim 1, comprising a wall configured for at least partly confining the first fluid for adjoining a display area of the electrowetting element, wherein, within the electrowetting element, an extent of at least one of the plurality of electrical elements and an extent of the dielectric layer is at least partly covered by the wall.

14. The electrowetting device according to claim 1, the electrowetting element comprising a reflector at least partly comprising a metallic material, the reflector located so as to be non-overlapping with at least one of the plurality of electrical elements.

15. The electrowetting device according to claim 1, wherein the dielectric layer has at least one of: a substantially uniform thickness along a length of the dielectric layer; a substantially uniform thickness along a width of the dielectric layer; or a thickness of approximately 200 to 500 nanometers.

16. The electrowetting device according to claim 1, wherein the dielectric material comprises at least one of: SiOCF, SiOF, SiNF or SiONF.

17. A portable apparatus comprising:
   an electrowetting device comprising an electrowetting element comprising:
      a first fluid;
      a second fluid immiscible with the first fluid; and
      a support plate comprising:
         an electrode, a configuration of the first fluid and the second fluid controllable with an applied voltage between the electrode and the second fluid;
         a plurality of electrical elements for use in provision of the applied voltage, the plurality of electrical elements comprising a first electrical element and a second electrical element, a first portion of the first electrical element overlapping a second portion of the second electrical element; and
         a dielectric layer between the first portion of the first electrical element and the second portion of the second electrical element, the dielectric layer at least partly comprising a dielectric material having a dielectric constant less than 3.9;
   at least one processor; and
   at least one memory comprising computer program instructions, the at least one memory and the computer program instructions being configured to, with the at least one processor, control the electrowetting device.

18. The portable apparatus according to claim 17, wherein an extent of the dielectric layer is greater than an extent of the first portion of the first electrical element, the extent of the dielectric layer being taken in a plane substantially parallel to a plane of the extent of the first portion of the first electrical element.

19. The portable apparatus according to claim 17, wherein a width of the dielectric layer is one of: greater than a width of the first electrical element, or at least twice the width of the first electrical element.

20. The portable apparatus according to claim 17, wherein a length of the dielectric layer is greater than a length of the first portion of the first electrical element, the length of the dielectric layer being taken in a direction substantially parallel to a direction of the length of the first portion of the first electrical element.

* * * * *

UNITED STATES PATENT AND TRADEMARK OFFICE
CERTIFICATE OF CORRECTION

PATENT NO. : 9,500,852 B1
APPLICATION NO. : 14/501805
DATED : November 22, 2016
INVENTOR(S) : Tauk et al.

It is certified that error appears in the above-identified patent and that said Letters Patent is hereby corrected as shown below:

In the Claims

In Column 18, Line 22, in Claim 1, delete "comprising;" and insert -- comprising: --, therefor.

In Column 18, Line 32, in Claim 1, delete "layer at least" and
insert -- layer between the first portion of the first electrical element and the second portion of the second electrical element,
the dielectric layer at least --, therefor.

Signed and Sealed this
Seventeenth Day of January, 2017

Michelle K. Lee
*Director of the United States Patent and Trademark Office*